United States Patent Office

2,989,570
Patented June 20, 1961

2,989,570
MANUFACTURE OF VINYLIDENE CHLORIDE
Franklin Conrad and Merle L. Gould, Baton Rouge, La., assignors to Ethyl Corporation, New York, N.Y., a corporation of Delaware
No Drawing. Filed Mar. 27, 1959, Ser. No. 802,312
3 Claims. (Cl. 260—654)

This invention relates to a process for the manufacture of vinylidene chloride, especially by the dehydrochlorination of 1,1,2-trichloroethane.

Various methods have been proposed for the manufacture of vinylidene chloride. These include thermal cracking and catalytic cracking of 1,1,2-trichloroethane. Various catalysts have been proposed for this dehydrochlorination step. Some of these have even resulted in processes which allow recovery of the hydrogen chloride produced in the reaction. In all of these methods, however, there has been one very serious limitation, viz, there is produced a variety of products containing only a relatively small proportion of vinylidene chloride. The products which almost invariably predominate are the cis and trans isomers of 1,2-dichloroethylene.

It is accordingly an object of the present invention to provide a new and improved process for the manufacture of vinylidene chloride which contains only a relatively small amount of by-products other than vinylidene chloride. Another object of the present invention is to provide a process for the manufacture of vinylidene chloride wherein the hydrogen chloride evolved can be recovered in useful form. It is also an object of the present invention to provide a process wherein the catalyst is recoverable in useful form, is non-corrosive and presents no handling problems.

These and other objects are attained in accordance with the following description of the invention which comprises broadly the dehydrochlorination of 1,1,2-trichloroethane to form vinylidene chloride by contacting liquid 1,1,2-trichloroethane and an organic amine compound, hereinafter defined, in a reaction zone and continuously removing vinylidene chloride and hydrogen chloride therefrom.

The said organic amine compound referred to above is one selected from a group of amines, quaternary ammonium chloride salts of amines, and the hydrochloric acid salts of amines. The amines employed are those having a pK value of less than 7, where pK refers to $\log_{10}K^{-1}$, K being the basic dissociation constant of the said compound. The hydrochloric acid salts and the quaternary ammonium chloride salt of the compounds employed are those formed from the free amines having a pK of less than 7. The reaction is conducted at atmospheric or supra atmospheric pressure, atmospheric pressure being preferred. Generally, where pressure is employed it should be no greater than about 300 pounds per square inch. Also, if supra atmospheric pressure is employed, it is generally desirable to employ only sufficient pressure to keep the 1,1,2-trichloroethane within the reaction zone in liquid form, while the vinylidene chloride and hydrogen chloride are evolved or distilled from the zone as gases. The temperature employed in a reaction wherein a quarternary ammonium chloride salt or a hydrochloric acid salt of an amine is employed is from about 150° C. to about 250° C. A preferred range is from about 210° C. to about 230° C.

When free amines are used to dehydrochlorinate, 1,1,2-trichloroethane in a stoichiometric reaction, temperatures up to 150° C. may be employed. A preferred temperature range for such reactions is from about 80° C. to about 150° C. but temperatures as low as about 30° C. can be employed. Higher temperatures can also be employed successfully in pressurized reactions.

As already stated, certain amines, quaternary ammonium chloride salts of amines or the hydrochloric acid salts of these amines can be employed to dehydrochlorinate 1,1,2-trichloroethane to form vinylidene chloride with the formation of only a small amount of by-products. It has also been discovered that the free amines form an even greater proportion of vinylidene chloride in the products than when the quaternary ammonium chloride or the hydrochloride salt of the amine is used. In the reaction however, it is in turn converted to the hydrochloride salt. It then functions as a true catalyst. In any event, highly desirable benefits are obtained by the use of the free amine and the crystalline hydrochloride salts which form along with vinylidene chloride may be easily separated from the reaction mixture and the free base regenerated for further use. As stated, the free amines which are employed, or their quaternary ammonium chloride or hydrochloride salts, are those having a pK value of less than about 7. These alone are useful for the practice of this invention. The term pK has been defined, but to amplify, by pK is meant the negative log of the basic dissociation constant, expressed as $\log_{10}K^{-1}$, where K is the basic dissociation constant expressed as the product of the concentrations of the ammonium and hydroxyl ions divided by the total concentration of un-ionized material present, either as the free base or hydrate. Examples of compounds which are useful in this invention are triethylamine, dibutylamine, n-butylamine, diethylamine, piperidine, hexamethylene diamine, ethanolamine, cyclohexyl dimethylamine, cyclohexylamine, benzylamine, ethylenediamine, 2-aminopyridine, diphenylguanidine, morpholine, N-methyl morpholine, triethanolamine, dicyclohexylamine, β-phenylethylamine, piperazine, n-hexylamine, dihexylamine, propylamine, diethylene triamine, triethylene tetramine, isopropylamine, isobutylamine, isoamylamine, disopropanolamine, di-2-ethylhexylamine, β-diethylaminoethanol, isopropanolamine, allylamine, n-amylamine, tetramethylene diamine, 2-amino-1-butanol, 2-methylpiperidine, N-methyl-N-phenylbenzylamine, N,N-diethylcyclohexylamine, N-ethylpiperidine, the hydrogen chloride salts and the quaternary ammonium chloride salts of any of the foregoing.

In the practice of this invention it is preferable that the quaternary ammonium chloride salts and the hydrochloride salts of the amines be dissolved in a solvent which is inert to the dehydrochlorination reaction. Such a solvent should preferably be one wherein at least a small portion of the compounds dissolve in the solvent. This however is not essential and the compound can even be insoluble in the solvent. The free amine is equally as effective with or without a solvent. A highly preferred solvent is Dowtherm which is a mixture of 2 parts by weight diphenyl ether and 1 part by weight diphenyl. Examples of other solvents which can be employed are diphenyl ether, chloronaphthalene, 1,2,4-trichlorobenzene and 1,3,5-trichlorobenzene or mixtures of any of these compounds.

The invention will be more fully understood from the following detailed description of the invention in its preferred mode of operation.

The process is preferably conducted by dissolving a small amount of the quaternary ammonium chloride salt or the hydrochloride salt of the amine in an inert solvent, such as Dowtherm. The solution is then charged into a reaction chamber. As stated, the free amine can be placed in a solvent or charged therein in its uncombined state. Liquid 1,1,2-trichloroethane is then charged into the said chamber and the reaction mixture raised to a temperature of from about 150° C. to about 240° C. if the quaternary ammonium chloride or hydrochloric acid salt of an amine is employed; or to a temperature of from about 30° C. to about 150° C., if the free amine is employed. The reaction can be conducted as a continuous operation or in batch. The reaction is preferably conducted at about atmospheric pressure. The products formed, essentially vinylidene chloride and hydrogen chloride, are evolved or distilled from the upper portion of the reaction chamber as formed.

As stated, another method of conducting this process is to charge the anhydrous or free amine into a reaction chamber and then introduce liquid 1,1,2-trichloroethane. The process can be conducted continuously or in batch. In all embodiments there is maintained a "liquefying" pressure, viz., sufficient pressure to keep the 1,1,2-trichloroethane in the liquid phase at the selected temperature. The products, essentially vinylidene chloride and hydrogen chloride, are evolved from the upper portion of the chamber. Generally higher temperatures are usually employed when conducting the reaction at supra atmospheric pressures. Obviously, however, the temperature and pressure, being related variables, are subject to considerable variation in accordance with the temperature and pressure ranges already given. It is generally preferred to carry out the reaction at about atmospheric pressure.

The process will be more fully understood from the following examples conducted under generally preferred conditions. All illustrate the selective dehydrochlorination of 1,1,2-trichloroethane to vinylidene chloride according to the present invention. Unless otherwise stated all proportions given are by weight.

The apparatus in which all of the following dehydrochlorination reactions were carried out consisted of a 300 ml. round bottom three-necked flask fitted with a thermometer and a Vigreaux column, which lead through a condenser to a receiver and to a water scrubber for absorption of hydrogen chloride. The 1,1,2-trichloroethane was conveniently added, continuously or in bulk, through the third neck. The product yielded was washed thoroughly with water and dried over anhydrous calcium chloride. Product distribution was determined by vapor phase chromatographic analysis after the product had been distilled through the Vigreaux column. The percentage of cracking was of no concern in these demonstrations because it was found that complete dehydrochlorination could be obtained by increasing the contact time between the 1,1,2-trichloroethane and the catalyst under reaction conditions. One method of increasing contact time is to use a tall reactor and feed 1,1,2-trichloroethane therein from the bottom. The reaction can be carried out continuously or in batch. The key and novel feature of the present invention is the fact that the products of the dehydrochlorination reaction contain a large proportion of vinylidene chloride, i.e., a high ratio of vinylidene chloride to total cracked product.

The following example illustrates a reaction between 1,1,2-trichloroethane and a stoichiometric amount of a free amine to yield vinylidene chloride.

EXAMPLE I

A mixture of 160 parts 1,1,2-trichloroethane and 24.2 parts of triethylamine was heated slowly to 105° C. at which temperature the amine hydrochloride became visible as a heavy condensing vapor. A low boiling fraction (19.6 parts), boiling point 30 to 34° C., was obtained. There was no further indication of reaction and no hydrogen chloride was evolved. This illustrated that stoichiometric amounts of 1,1,2-trichloroethane and triethylamine reacted. The product was shown by chromatographic analysis to contain 90.8 percent by weight vinylidene chloride.

In the following example, n-butylamine was employed to dehydrochlorinate 1,1,2-trichloroethane to form vinylidene chloride. The reaction was conducted generally as in the above example.

EXAMPLE II

A mixture of 21.9 parts of butylamine and 40.0 parts of 1,1,2-trichloroethane was heated at 50–60° C. for about 5 minutes, after which time the crystalline hydrochloride began to form. The temperature was increased to 80° C. and there was obtained about 19 parts of distillate. These products contained 96.3 percent vinylidene chloride.

EXAMPLE III

A mixture of 133.4 parts of 1,1,2-trichloroethane and 17.0 parts of piperidine was heated slowly to 80° C. Amine hydrochloride began to form as a vapor. The temperature was then increased to 110° C. and 13.6 parts of distillate, boiling point 32–35° C., was obtained. Analysis showed that 89.3 percent of the distillate was vinylidene chloride and 6.8 percent unreacted 1,1,2-trichloroethane. This amounted to about 96 percent vinylidene chloride in the cracked products.

In all of the foregoing examples it will be understood that the hydrochloride salts so formed can be used as dehydrochlorinating catalysts, generally at slightly higher temperatures.

Table I below lists other amines which produced vinylidene chloride from 1,1,2-trichloroethane under generally similar conditions as in the above examples, except that in these instances the amines were dissolved in Dowtherm. The 1,1,2-trichloroethane was then fed into the Dowtherm at reaction conditions, i.e., at atmospheric pressure and at the temperature shown in the table. The weight percent of vinylidene chloride which was produced within the cracked product is shown in the table opposite the nitrogenous organic basic compound employed.

*Table I*

| Dehydrochlorinating Agent | Temperature, ° C. | Wt. Percent in Cracked Products |
|---|---|---|
| 2-Amino pyridine | 125 | 84.2 |
| Benzylamine | 125 | 90.5 |
| Dibutylamine | 125 | 88.0 |
| Diethanolamine | 110–115 | 95.0 |
| Ethanolamine | 50 | 94.2 |
| n-Butylamine | 75–80 | 96.3 |
| Triethanolamine | 160–165 | 87.0 |

Table II below shows demonstrations in which 1,1,2-trichloroethane was added slowly to a catalyst in Dowtherm solution at the temperature shown. The 1,1,2-trichloroethane was added continuously while maintaining a constant liquid level within the reactor. The catalytic hydrochloric acid salts in general gave very satisfactory results through the ratio of vinylidene chloride to total cracked product was not quite as high as when the free amines were used as dehydrochlorinating agents.

*Table II*

| Dehydrochlorinating Agent | Temperature, ° C. | Weight Percent Vinylidene Chloride in Cracked Product |
|---|---|---|
| β-Phenylethylamine·HCl | 215 | 66.9 |
| Butylamine·HCl | 220 | 45.0 |
| Dibutylamine·HCl | 230 | 73.7 |
| Dibutylamine·HCl | 230 | 71.5 |
| Diethylamine·HCl | 215 | 48.7 |
| Diethylamine·HCl | 215 | 47.9 |
| Piperidine·HCl | 215 | 65.5 |

The following example demonstrates a run wherein a quaternary ammonium chloride is employed for the dehydrochlorination reaction.

EXAMPLE IV 1,1,2-trichloroethane is added slowly to a reactor which contains a mixture of 75 parts of tetramethylammonium chloride and 250 parts of Dowtherm. The temperature is maintained at 225–230° C. The liquid product resulting from the dehydrochlorination reaction consists primarily of vinylidene chloride and hydrogen chloride. The products are continuously evolved during the reaction.

It is quite obvious that a number of variations can be made in the process of the invention without departing from the spirit and scope thereof.

Having described the invention, what is claimed is:

1. A process for the manufacture of vinylidene chloride by the dehydroclorination of 1,1,2-trichloroethane comprising contacting liquid 1,1,2-trichloroethane and an organic amine, as hereinafter defined, in a reaction zone, maintaining therein a temperature of from about 30° C. to about 250° C., and continuously distilling vinylidene chloride and hydrogen chloride therefrom, the said organic amine being a compound selected from a group of compounds consisting of amines having a pK value of less than about 7, and the hydochloric acid salts and the quaternary ammonium chloride salts of such amines.

2. A process for the manufacture of vinylidene chloride by the dehydrochlorination of 1,1,2-trichloroethane comprising contacting liquid 1,1,2-trichloroethane and an organic amine having a pK value of less than about 7 in a reaction zone while maintaining the zone at a temperature while from about 80° C. to 150° C., and continuously distilling vinylidene chloride and hydrogen chloride therefrom.

3. A process for the manufacture of vinylidene chloride by the dehydrochlorination of 1,1,2-trichloroethane comprising contacting liquid 1,1,2-trichloroethane and an organic amine catalyst, as hereinafter defined, in a reaction zone, maintaining therein a temperature of from about 150° C. to about 250° C., and continuously distilling vinylidene chloride and hydrogen chloride therefrom, said organic amine catalyst being a compound selected from a group of compounds consisting of hydrochloride salts and quaternary ammonium chloride salts of amines having a pK value of less than about 7.

References Cited in the file of this patent
UNITED STATES PATENTS

| | | |
|---|---|---|
| 2,361,072 | Vining | Oct. 24, 1944 |
| 2,541,724 | Stowe et al. | Feb. 13, 1951 |
| 2,879,311 | Hawkins | Mar. 24, 1959 |